(12) United States Patent
Zhu

(10) Patent No.: US 8,186,398 B2
(45) Date of Patent: May 29, 2012

(54) ELECTRIC ROUTER

(75) Inventor: Yongbing Zhu, Nanjing (CN)

(73) Assignee: Chervon Limited, Hong Kong (HK)

( * ) Notice: Subject to any disclaimer, the term of this patent is extended or adjusted under 35 U.S.C. 154(b) by 176 days.

(21) Appl. No.: 12/813,764

(22) Filed: Jun. 11, 2010

(65) Prior Publication Data

US 2010/0319809 A1    Dec. 23, 2010

(30) Foreign Application Priority Data

Jun. 19, 2009  (CN) .................. 2009 2 0046677 U

(51) Int. Cl.
*B27C 5/10* (2006.01)

(52) U.S. Cl. .................. 144/136.95; 409/134; 409/182

(58) Field of Classification Search .............. 144/48.5, 144/136.95, 154.5; 409/182, 134
See application file for complete search history.

(56) References Cited

U.S. PATENT DOCUMENTS 6,244,797 B1 *  6/2001  Wheeler ................... 409/182
7,073,993 B2 *  7/2006  Cooper et al. ............ 409/182
7,108,464 B2 *  9/2006  Cooper et al. ............ 409/182
7,303,364 B2 * 12/2007  Cooper et al. ............ 409/182

* cited by examiner

*Primary Examiner* — Shelley Self
(74) *Attorney, Agent, or Firm* — Greenberg Traurig, LLP

(57) ABSTRACT

An electric router includes a housing, a base, a motor having an output shaft, a first switch for the motor, a locking member having a first end and a second end, a second switch connected in series with the first switch, and a connecting rod having a first end positioned proximate to the base and a second end positioned remotely from the base. The first end of the connecting rod is connected with the second end of the locking member, the second end of the connecting rod is connected with the second switch, and the second end of the connecting rod selectively keeps the second switch in one of a switch-off position when the first end of the locking member engages with the output shaft and a switch-on position when the first end of the locking member disengages from the output shaft.

3 Claims, 6 Drawing Sheets

ELECTRIC ROUTER

RELATED APPLICATION

This application claims the benefit of CN 200920046677.3 filed on Jun. 19, 2009 the disclosure of which is incorporated herein by reference it its entirety.

BACKGROUND

This disclosure relates to an electric router and, more particularly, to an electric router with a shaft locking mechanism.

A variety of electric routers that are currently available require a shaft locking mechanism when an operator exchanges blades. It has been seen, however, that the motor may be damaged if the operator accidentally actuates the motor when exchanging blades in the shaft locking state.

SUMMARY

In order to overcome the disadvantage mentioned above, the subject electric router provides a safety mechanism to protect the motor of the router when the operator exchanges the blades. To this end, the electric router comprises a housing, a base connected to the housing, a motor mounted in the housing having an output shaft formed with a first central line, a first switch mounted to the housing for controlling the motor, a locking member mounted in the housing and formed with a second central line and having a first end located close to the output shaft and a second end located removed from the output shaft. The electric router further comprises a second switch located in the housing and connected in series with the first switch, and a connecting rod mounted in the housing and having a first end positioned close to the base and a second end positioned removed from the base, wherein the first end of the connecting rod is connected with the second end of the locking member, and the second end of the connecting rod is connected with the second switch. The second end of the connecting rod selectively keeps the second switch in one of a switch-off position when the first end of the locking member engages with the output shaft and a switch-on position when the first end of the locking member disengages from the output shaft. With the aid of such a mechanism, the motor will not be damaged even if the operator accidentally actuates the motor when exchanging the blades.

DETAILED DESCRIPTION

Figure 1:
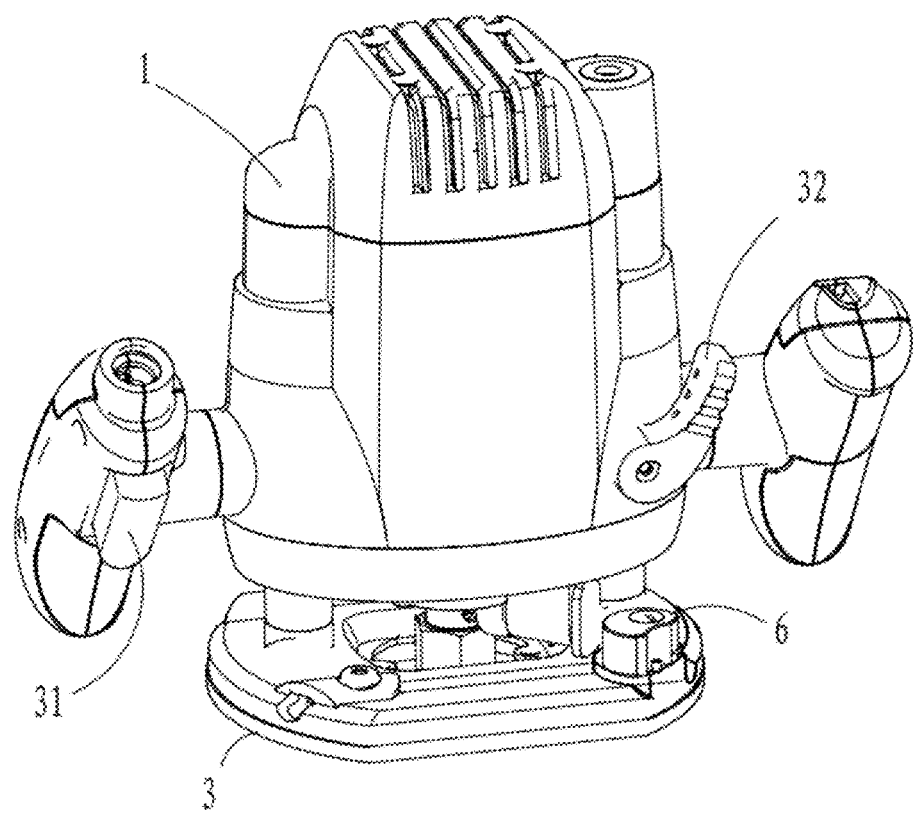
FIG. 1 is a perspective view of an electric router in a shaft locking state constructed according to the subject disclosure.
Figure 2:
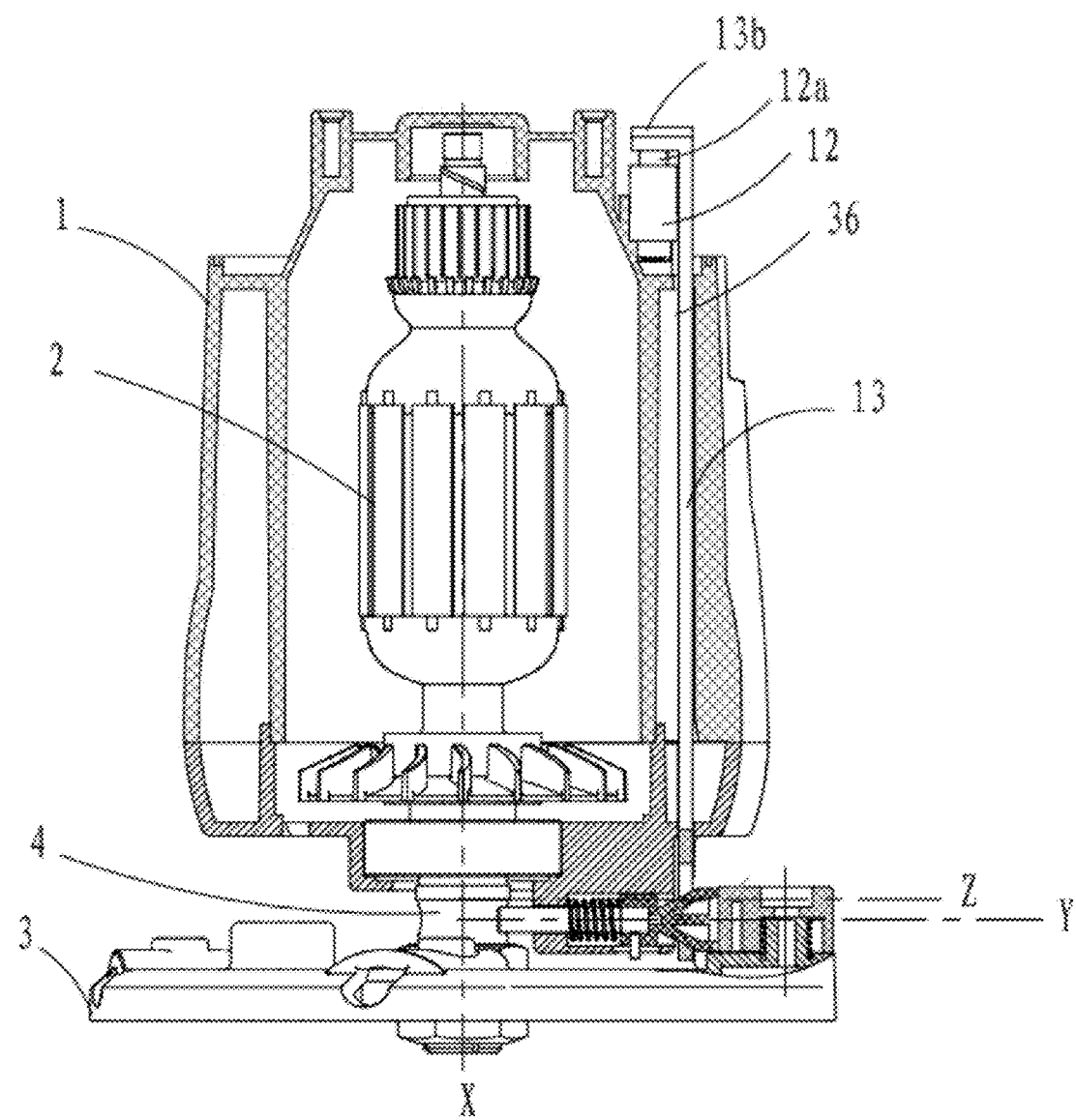
FIG. 2 is a sectional view of the electric router of FIG. 1 in the shaft locking state.
Figure 3:
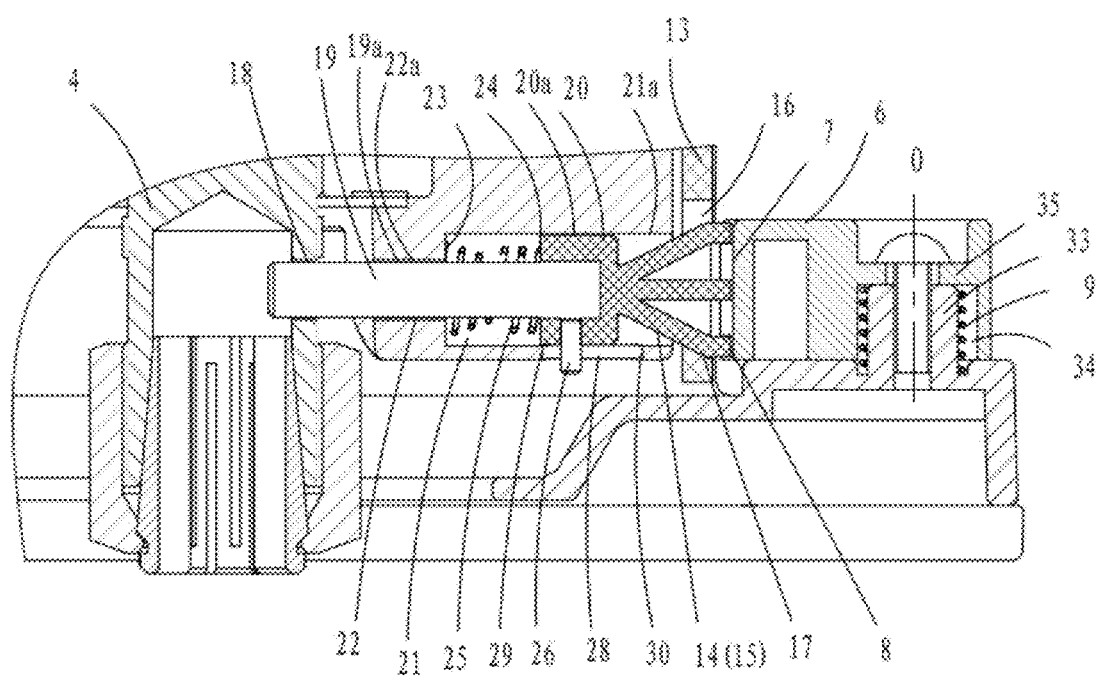
FIG. 3 is an enlarged view of the electric router of FIG. 1 in the shaft locking state.

As shown in FIGS. 1, 2 and 3, an electric router comprises a housing 1, a motor 2 mounted in the housing 1, and a base 3 mounted to the housing 1. The motor 2 has an output shaft 4 which is formed with a first central line X and a chuck for a cutting member is mounted to the output shaft 4. A first switch 31 mounted to the housing 1 is connected to the motor 2 and can be operated to start or stop the motor 2. An operating handle 32 mounted to the housing 1 can be operated to adjust the position of the housing 1 with respect to the base 3.

As shown in FIGS. 2, 3, 5 and 6, a lower end of the housing 1 is formed with a first guide groove 21 and a second guide groove 22 which can be formed as a cylindrical hole, respectively. The first guide groove 21 is formed with a bottom surface 23 at an end thereof that is positioned close to the output shaft 4 and is open at the opposite end. The first guide groove 21 communicates with the second guide groove 22 at the bottom surface 23 and is formed with a second central line Y which is perpendicular to the first central line X. The first guide groove 21 and the second guide groove 22 are respectively formed with a guide plane 21a, 22a in the same circumferential direction. A locking member 5 has a first end close to the output shaft 4 and a second end far away from the output shaft 4. The first end of the locking member 5 is formed with a pin 19 which cooperates with the second guide groove 22 and a guide plane 19a is formed on the pin 19. The second end of the locking member 5 is formed with an end surface 8 which is preferably perpendicular to the second central line Y and an outer surface 14 which is formed with an inclined surface 15 at the side close to the base 3. Preferably, an angle of thirty (30) degrees is formed between the inclined surface 15 and the second central line Y.

A central flange portion 20 which cooperates with the first guide groove 22 is formed between the first end and the second end of the locking member 5. The flange portion 20 is formed with a circular outer surface and an end surface 24 opposite to the bottom surface 23. A guide plane 20a in the same circumferential direction with the guide plane 19a is formed on the circular outer surface of the flange portion 20. When the locking member 5 slides in the first guide groove 21 and the second guide groove 22, the guide planes 19a, 20a respectively cooperate with the guide planes 22a, 21a so that the rotation of the locking member 5 is restricted.

A compression spring 25 with one end connected to the flange portion 20 and the other end connected to the bottom surface 23 of the first guide groove is mounted in the guide groove 21. Further, a position-restricting pin 26 facing to the base 3 extends from the flange portion 20 in the direction of the central line X. A position-restricting groove 28 is formed at a side of an inner surface of the first guide groove 21 facing to the base 3. The position-restricting groove 28 is formed with an end surface 29 positioned close to the output shaft 4 and an end surface 30 positioned remotely from the output shaft 4 in the direction of the second central line Y, and the position-restricting pin 26 extends into the position-restricting groove 28. As shown in FIG. 3, the position-restricting pin 26 engages with the end surface 30 of the position-restricting groove 28 under the action of the compression spring 25 when the shaft lock is in a released position.

The base 3 is formed with a cylindrical projection 33, and an operating member 6 includes a central hole 34 and is formed with a central line O. The operating member 6 is rotatably mounted onto the base 3 by the cooperation of the central hole 34 and the cylindrical projection 33. The operating member 6 further includes a neck portion 35 for restricting the movement of the operating member 6 with respect to the base 3 along the central line O, and the structure of which is well known for those skilled in the art and thus will not be described herein. A torsion spring 9 is mounted between the operating member 6 and the base 3. The operating member 6 may be a cam member having a cam surface 7. A first stepped surface 10, which is preferably parallel to the central line O, is formed on the cam surface 7, and a second stepped surface 11, which is preferably perpendicular to the end surface 8, is formed on the end surface 8 of the locking member 5.

In the general state, the cam member 6 is in a second position under the action of the torsion spring and the shaft lock is in the released state. When the operator needs to exchange the blades, the cam member 6 is rotated from a first position to the second position by overcoming the torsional force of the torsion spring 9. During this process, the cam surface 7 acts on the end surface 8 and pushes the first end of the locking member 5 into a groove 18 of the output shaft 4 which corresponds to the locking member 5. During rotation of the cam member 6, once the first stepped surface 10 of the cam surface 7 traverses the second stepped surface 11 on the end surface 8, the operator can release the cam member 6, and temporally the first stepped surface 10 engages with the second stepped surface 11 so as to ensure that the cam member 6 is in the first position. Then, the operator can exchange the blades. After the blade is exchanged, the operator can press down upon the operating handle 32 to move the housing 1 upward with respect to the base 3 under the action of the spring (not shown), so that the first stepped surface 10 disengages from the second stepped surface 11 the locking member disengages from the groove 18 of the output shaft 4 under the action of the compression spring 25, and the cam member 6 automatically returns to the second position under the action of the torsion spring 9, as shown in FIG. 4.

As shown in FIGS. 2 and 3, the electric router further comprises a second switch 12 which is mounted on the upper portion of the housing 1 and which is connected in series with the first switch 31. An elongate groove 36 extending substantially parallel to the central line X is formed within the housing. The connecting rod 13 extending through the elongate groove 36 in the housing is slidable in the elongate groove 36. The connecting rod 13 has a first end 13a and a second end 13b which is perpendicular to the first end 13a. The first end 13a of the connecting rod 13 is formed with a groove 16, wherein the groove 16 is formed with an inner surface and a central line Z which is parallel to the central line Y. The inner surface of the groove 16 having a second inclined surface 17, which is inclined to the central line Z by an angle of thirty (30) degrees and which is parallel to the first inclined surface 15. The second end of the locking member 5 is located in the groove 16.

As shown in FIGS. 2 and 3, when the cam member 6 is rotated from the second position to the first position, the first inclined surface 15 of the locking member 5 pushes the second inclined surface 17 of the connecting rod 13 so as to push the connecting rod 13 to move downwards. The second end 13b of the connecting rod 13 presses down the touch switch 12a by overcoming the spring force of the touch switch 12a, thereby switching off the touch switch 12a. In this manner, the motor cannot be started if the first switch is operated at this time.

Figure 4:
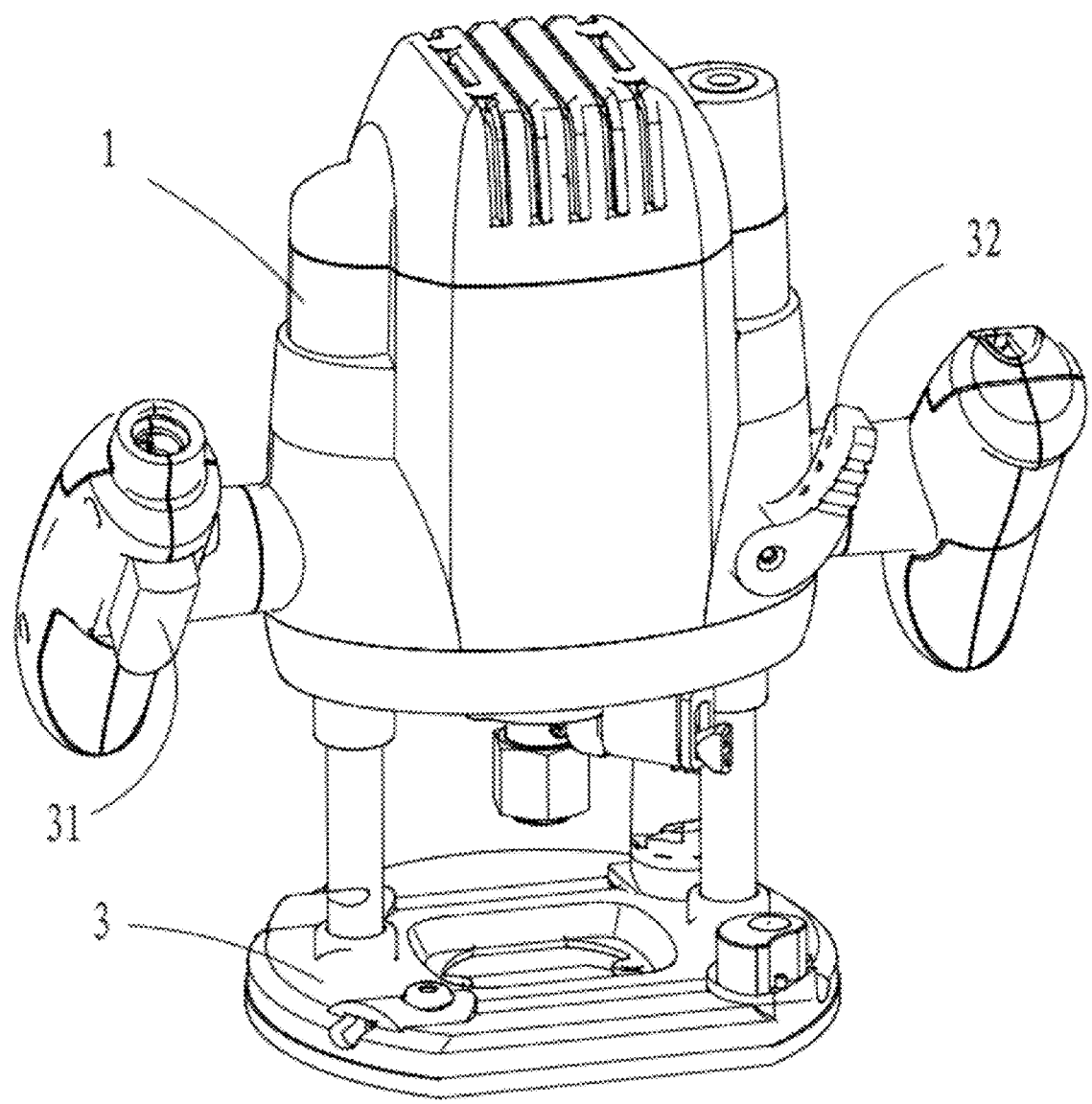
FIG. 4 is a perspective view of the electric router of FIG. 1 in a shaft releasing state.
Figure 5:
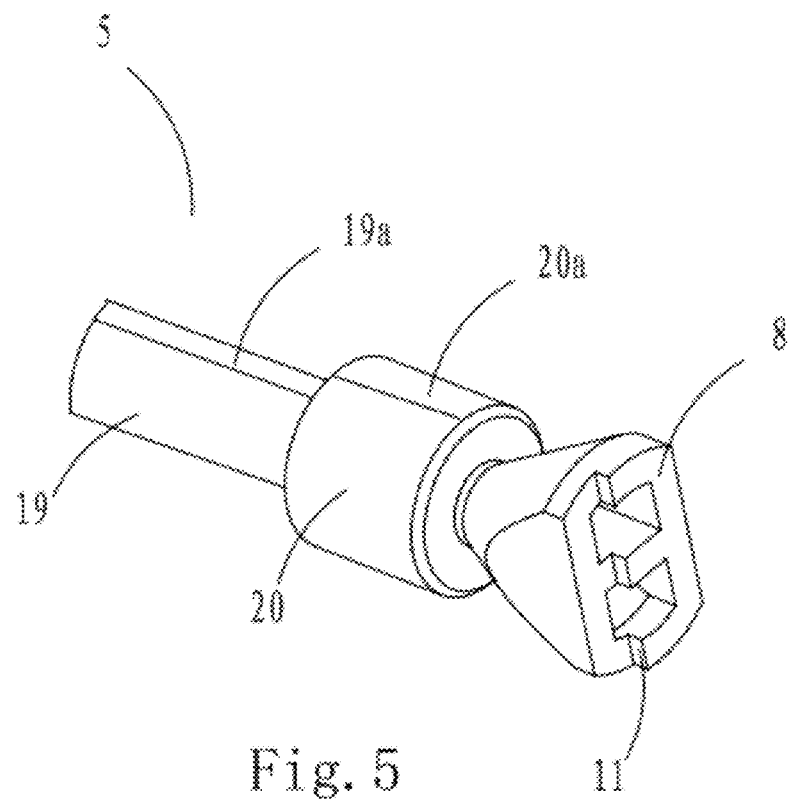
FIG. 5 is a perspective view of a locking member of the electric router of FIG. 1.
Figure 6:
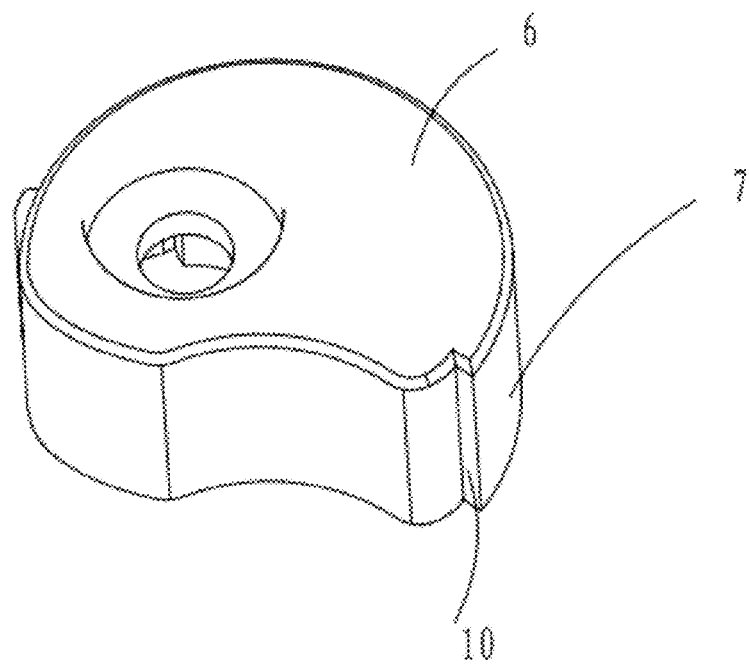
FIG. 6 is a perspective view of an operating member of the electric router of FIG. 1.

As shown in FIGS. 2 and 4, when the cam member 6 returns to the second position under the action of the torsion spring 9, the second inclined surface 17 is released by the first inclined surface 15 under the action of the compression spring 25, and the second end 13b of the connecting rod 13 is pushed to move upwards under the action of the spring force of the touch switch 12a, and simultaneously the second switch is switched on. Thereby, the first switch can be operated to start the motor at this time.

Figure 7:
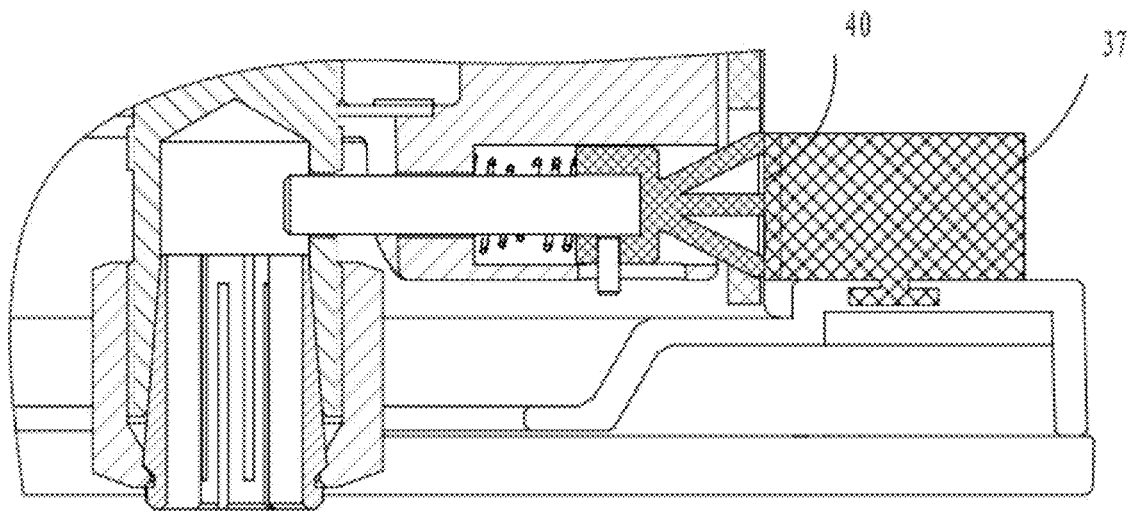
FIG. 7 is a further embodiment of the operating member of the electric router constructed according to the subject disclosure.
Figure 8:
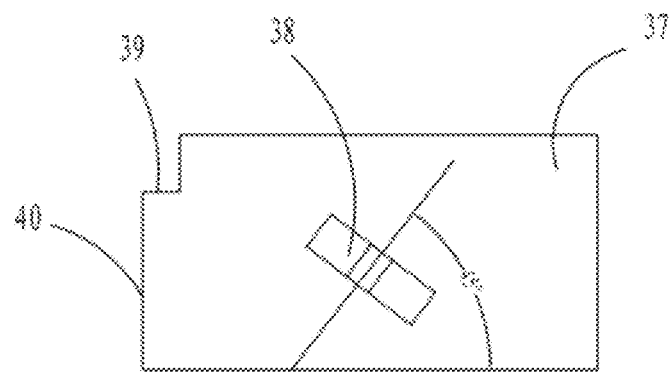
FIG. 8 is a top view of the operating member of the electric router as shown in FIG. 7.

As shown in FIGS. 7 and 8, a sliding block 37 is slidably mounted into a T-shaped groove in the base 3 via a T-shaped block 38 on the sliding block. A compression spring (not shown) is mounted between the sliding block 37 and the base to push the sliding block 37 towards the second position. This slidable mounting arrangement is well known for those skilled in the art, thus it will not be described herein. The sliding block 37 is provided with a surface 40, preferably, the sliding direction is inclined to the surface 40 by an angle of 45 degrees. The surface 40 is preferably parallel to the end surface 8 of the locking member and is provided with a third stepped surface 39 which is preferably perpendicular to the surface 40.

In the general state, the sliding block 37 is in the second position under the action of the compression spring, and the axial lock is in the released state. When the operator needs to exchange the blades, the operator pushes the sliding block 37 to move from the second position to the first position by overcoming the elastic force of the compression spring 38. During this process, the surface 40 acts on the end surface 8 and pushes the first end of the locking member 5 into a groove 18 of the output shaft 4 which corresponds to the locking member 5. During pushing of the sliding block 37, once the third stepped surface 39 on the surface 40 traverses the second stepped surface 11 of the end surface 8, the operator releases the sliding block 37, and here the third stepped surface 39 engages with the second stepped surface 11 so as to ensure that the sliding block 37 is in the first position. Then, the operator can exchange the blades. After the blade is exchanged, the operator presses down the operating handle 32, then the housing 1 moves upwards with respect to the base 3 under the action of the spring (not shown), so that the third stepped surface 39 disengages from the second stepped surface 11, the locking member 5 disengages from the groove 18 of the output shaft 4 under the action of the compression spring 25, and the sliding block 37 automatically returns to the second position under the action of the compression spring 38.

The above description and the illustration in the drawings are only preferred embodiments and are not intended to limit the protection scope of the claimed invention. Rather, upon review of the above description and the drawings, those of ordinary skill in the art can understand that many modifications and varieties can be achieved without departing from the spirit of the invention as claimed below.

What is claimed is:
1. An electric router, comprising:
a housing;
a base connecting to the housing;
a motor mounted in the housing and having an output shaft formed with a first central line,
a first switch mounted to the housing for controlling the motor;
a locking member mounted in the housing and formed with a second central line, the locking member having a first end positioned proximate to the output shaft and a second end positioned remotely from the output shaft;
a second switch located in the housing and connected in series with the first switch; and
a connecting rod mounted in the housing and having a first end positioned proximate to the base and a second end positioned remotely from the base, wherein the first end of the connecting rod is connected with the second end of the locking member, the second end of the connecting rod is connected with the second switch, and wherein the second end of the connecting rod selectively keeps the second switch in one of a switch-off position when the first end of the locking member engages with the output shaft and a switch-on position when the first end of the locking member disengages from the output shaft.

2. The electric router according to claim 1, wherein the second end of the locking member has an outer surface which is formed with a first inclined surface having a certain angle with respect to the second central line, the first end of the connecting rod is formed with a groove which has an inner surface and has a third central line parallel to the second central line, and wherein the inner surface of the groove is formed with a second inclined surface having a certain angle with respect to the third central line and cooperating with the first inclined surface.

3. The electric router according to claim 2, wherein the first inclined surface is formed in the outer surface of the locking member at a side positioned proximate to the base, the second inclined surface is formed in the inner surface of the groove of the connecting rod at a side positioned proximate to the base, and wherein the first inclined surface and the second inclined surface are parallel to each other.

* * * * *